(12) United States Patent
Bucco et al.

(10) Patent No.: US 7,964,056 B2
(45) Date of Patent: Jun. 21, 2011

(54) WATER-BASED ADHESIVE CURING PROCESS AND ASSOCIATED APPARATUS

(76) Inventors: Anthony R. Bucco, Boonton, NJ (US); William Zelman, White Plains, NY (US)

( * ) Notice: Subject to any disclaimer, the term of this patent is extended or adjusted under 35 U.S.C. 154(b) by 101 days.

(21) Appl. No.: 12/285,648

(22) Filed: Oct. 10, 2008

(65) Prior Publication Data

US 2009/0114340 A1    May 7, 2009

Related U.S. Application Data

(60) Provisional application No. 60/996,128, filed on Nov. 2, 2007.

(51) Int. Cl.
C09J 5/02 (2006.01)
B32B 37/06 (2006.01)

(52) U.S. Cl. ........ 156/322; 156/320; 156/210; 156/499; 156/356; 156/217; 156/224; 156/227; 156/358

(58) Field of Classification Search .................. 156/322, 156/321, 499, 210, 356, 320, 212, 217, 224, 156/227, 358
See application file for complete search history.

(56) References Cited

U.S. PATENT DOCUMENTS

| | | | |
|---|---|---|---|
| 1,851,709 A | | 3/1932 | Laucks et al. |
| 3,920,496 A | * | 11/1975 | Wilkinson et al. ............. 156/82 |
| 4,375,383 A | | 3/1983 | Sewell et al. |
| 4,490,129 A | | 12/1984 | Oakley |
| 4,778,554 A | | 10/1988 | Doman |
| 5,567,257 A | * | 10/1996 | Higgins et al. .................. 156/72 |
| 5,916,409 A | * | 6/1999 | Mosburger .................... 156/322 |
| 6,083,580 A | * | 7/2000 | Finestone et al. ............ 428/34.2 |
| 6,939,421 B2 | * | 9/2005 | Bremont et al. ................ 156/66 |
| 7,238,149 B2 | | 7/2007 | Lorenz et al. |
| 2004/0164135 A1 | | 8/2004 | Gong et al. |
| 2004/0166238 A1 | | 8/2004 | Nowicki et al. |

* cited by examiner

Primary Examiner — Khanh Nguyen
Assistant Examiner — Keith T Aziz
(74) Attorney, Agent, or Firm — Thomas J. Germinario

(57) ABSTRACT

A process and implementing apparatus are disclosed by which the curing time of a water-based adhesive is shortened as applied to the bonding of two fibrous substrates, such as paperboard or corrugated fiberboard.

10 Claims, 1 Drawing Sheet

WATER-BASED ADHESIVE CURING PROCESS AND ASSOCIATED APPARATUS

This application claims the benefit of the filing date of Provisional Application No. 60/996,128, filed Nov. 2, 2007.

FIELD OF THE INVENTION

This Invention is directed to a process and associated apparatus for rapidly curing a water-based adhesive, which process and associated apparatus are useful in bonding together two fibrous surfaces, such as surfaces comprising paperboard or corrugated fiberboard.

BACKGROUND OF THE INVENTION

Because of their rapid cure time, hot-melt adhesives are at present predominantly used in the sealing of corrugated fiberboard containers made from pre-cut flats. The rapid cure time of hot-melt adhesives provides economic advantages insofar as it enables shorter assembly lines and faster line speeds. But hot-melt adhesives also have a number of disadvantages, which have become increasingly onerous in recent years.

The material cost of hot-melt adhesives, which typically have an ethylene-vinyl acetate polymer base, has risen sharply over the past two decades, to the point where they may be several times more expensive than water-based adhesives. There is also a high energy cost associated with hot-melt adhesives, which must be heated to 250-350° F. before being applied to a corrugated fiberboard surface. The elevated application temperatures of hot-melt adhesives give rise to health and safety problems relating to burns and odors. High application temperatures often render hot-melt adhesives unsuitable for packaging of heat-sensitive products.

Equipment and maintenance costs are also significantly higher for hot-melt as compared with water-based adhesives. Temperature and cooling rate of the hot-melt adhesive must be controlled within a rather narrow range or the resulting bond is weakened. Hot-melt adhesives are difficult to spread and do not readily penetrate between the fibers of the substrate. On the other hand, due to their relatively low viscosity, water-based adhesive, such as polyvinyl acetate emulsions, can be sprayed or extruded in a thin layer that forms a strong adhesive bond. The relatively low viscosity of water-based adhesives also facilitates better penetration of a fibrous substrate for stronger bonding than is achievable with hot-melt adhesives.

The superior bonding of water-based adhesives also remains stronger over a greater range of temperatures than for hot-melt adhesives, which soften at temperatures over 165° F. and may become brittle below 40° F.

Finally, water-based adhesives offer an important environmental advantage as compared with hot-melts, since corrugated containers assembled with a water-based adhesive can be re-pulped and recycled without removing or separating the adhesive layers.

Despite all of the foregoing advantages of water-based adhesives, one factor has kept them non-competitive with hot-melt adhesives in the sealing of corrugated containers—their relatively slow curing time. Under the type of compression typically used on carton sealing lines, a hot-melt adhesive will set in about 1 to 3 seconds, as compared with 10 to 20 seconds for a water-based adhesive.

In an effort to overcome this deficiency, the prior art has largely focused on methods of heating the water-based adhesive prior to the compression/sealing stage. Examples of this approach are disclosed in Oakley, U.S. Pat. No. 4,490,129, Gong et al., Pub. No. US2004/0164135, and Nowicki et al., Pub. No. US2004/0166238. In a slight variation of the same theme, Lorenz et al., U.S. Pat. No. 7,238,149, teaches a process whereby a special aqueous-based adhesive, comprising a semi-crystalline vinyl acetate-ethylene polymer emulsion, is heated during the sealing stage.

These methods of shortening the curing time of water-based adhesives by applying heat to the adhesive have in practice proven ineffective, however. The heating of the water-based adhesive changes its physical properties and results in substantially less bonding strength.

An alternate approach to direct heating of the water-based adhesive has been to heat the water-based adhesive indirectly by pre-heating the cooperating surface that is to be bonded with the surface to which the adhesive is applied (the latter being hereinafter referred to as the "application surface"). The heat thus stored in the cooperating surface is then transferred to the water-based adhesive when the two surfaces are compressed together, thereby causing the adhesive to cure more quickly. Such a method is taught by Doman, U.S. Pat. No. 4,778,554. Here again, however, the water-based adhesive is being heated, albeit indirectly.

Besides weakening the resulting adhesive bond, the methods that attempt to reduce cure time by heating the water-based adhesive (whether directly or indirectly) effectively negate the water-based advantage of eliminating adhesive heating costs.

In Sewell et al., U.S. Pat. No. 4,375,383, the inventors have endeavored to shorten the curing time while retaining the advantages of the relatively low viscosity of water-based adhesive. They recognize that the strength of the adhesive bond is increased by achieving the two objectives of (a) applying the adhesive in a thin discrete pattern, and (b) inducing the adhesive to penetrate between the fibers of the substrate. They also recognize that both of these objectives can be achieved only if the inherent viscosity of the water-based adhesive is retained and not altered by heating.

The process taught by Sewell et al. comprises (i) spraying the water-based adhesive on the application surface, and then (ii) joining the application surface with the cooperating surface under high pressure (20-160 lbs/sq. in.) sufficient to force the adhesive into the interstices between the fibers of the two surfaces. Using this process, the inventors claim to reduce the adhesive curing time to 2 seconds or less.

There is, however, a major drawback to the Sewell process as applied to the sealing of corrugated cartons. The typical carton assembly line operates as follows: (1) the bottom and side walls of the box are first formed from a pre-cut flat pattern; then (2) the product is placed in the carton while the four top flaps of the carton remain open; then (3) the two innermost top flaps (referred to as the "minor flaps") are closed; while (4) adhesive is applied to the lower surfaces of the two outermost top flaps (referred to as the "major flaps"); then (5) the major flaps are closed and compressed against the minor flaps long enough for the adhesive to set.

As can be seen in FIGS. 1-3 of the Sewell patent, the high pressure sealing process taught therein depends upon the presence of a rigid support below the bottom piece of corrugated cardboard. But in sealing the top flaps of a corrugated carton, there is no support under the minor flaps other than the product itself and associated packing materials, which usually are not rigid and which may be damaged by high pressure. Therefore, while the Sewell process may be suitable for sealing the bottom of a corrugated carton, it is not suitable for sealing the top flaps.

Consequently, there is a need, as yet unaddressed by the existing art, for a process and associated apparatus that will reduce the curing time of a water-based adhesive while not increasing the adhesive's viscosity. Such a process should be readily applicable to a conventional corrugated carton assembly line. The present invention fulfills this need by providing a process, with supporting apparatus, by which, prior to adhesive application, the application surface is briefly exposed to a heat source so as to open and expand the interstices between the fibers and thus render the surface more penetrable to a water-based adhesive. This process, which will be described in greater detail hereinbelow, is capable of reducing the curing time of water-based adhesives to 2 seconds or less while producing an adhesive bond that equals or exceeds the strength of a bond formed by a water-based adhesive cured for 10-20 seconds or more.

SUMMARY OF THE INVENTION

It is an object of the present invention to provide a process with implementing apparatus by which the curing time of a water-based adhesive, such as a polyvinyl acetate emulsion, applied to a fibrous substrate, such as paperboard or corrugated fiberboard, is significantly shortened.

It is another object of the present invention to provide a process with implementing apparatus to shorten the curing time of water-based adhesives to the extent that it's curing time is equal or less than the curing time of hot-melt adhesives, which is typically 1 to 3 seconds, so as to enable the substitution of water-based adhesives for hot-melt adhesives in the fabrication and sealing of corrugated fiberboard containers without either increasing the length of the container assembly line or decreasing the line speed.

It is a further object of the present invention to realize the advantages of substituting water-based adhesives for hot-melt adhesives in the fabrication and sealing of corrugated fiberboard containers, including reduced material and energy costs, avoidance of health and safety problems associated with high temperatures, compatibility with heat-sensitive products, reduced equipment and maintenance expenses, stronger and more reliable adhesive bonding, and easier recycling.

It is yet another object of the present invention to provide a process with implementing apparatus to shorten the curing time of water-based adhesives while at the same time retaining their relatively low viscosity, which enables such adhesives to be spread readily over a fibrous substrate in a thin layer and to penetrate between the fibers of the substrate, both of which capabilities are essential to produce a strong adhesive bond.

It is yet a further object of the present invention to provide a process with implementing apparatus to shorten the curing time of a water-based adhesive while avoiding the energy costs associated with substantial heating of the adhesive, whether directly or indirectly.

It is still another object of the present invention to provide a process with implementing apparatus for shortening the curing time of a water-based adhesive, which process and apparatus can readily be applied to and integrated with a conventional corrugated container assembly line designed for use of a hot-melt adhesive without extensive modifications to the conventional assembly line.

It is still a further object of the present invention to provide a process with implementing apparatus for shortening the curing time of a water-based adhesive, which process and apparatus are compatible with packaging requirements for fragile, perishable and/or heat-sensitive products.

All of the foregoing as well as other beneficial objectives are achieved by the present invention through a rapid heat pre-treatment of the fibrous substrate. Prior to the application of a water-based adhesive, one or more areas of the application surface to which adhesive is to be applied (referred to hereafter as the "application areas") are exposed to a heat source, which raises the temperature of the application areas to above 150° F. (a process referred to hereafter as "rapid heat pre-treatment"). Preferably, the heat source is a hot air blower that raises the temperature of the application areas to approximately 180° F. Optionally, the rapid heat pre-treatment process can also be applied to those areas of the cooperating surface which will come into contact with the application areas (referred to hereafter as the "cooperating areas"), so that the cooperating areas also become more susceptible to penetration by the water-based adhesive. The rapid heat pre-treatment has the effect of causing the "pores," i.e., the interstices between the fibers, of the substrate to open and expand, thereby rendering the fibrous substrate more susceptible to penetration by the water-based adhesive.

Immediately after the rapid heat pre-treatment of the application areas, a water-based adhesive is applied to the application areas, preferably by spraying or extrusion means, then the application surface is brought into contact with the cooperating surface under compression for approximately 1-3 seconds, after which time the water-based adhesive has cured and a secure and durable adhesive bond is formed between the application surface and the cooperating surface.

The apparatus required to implement this process comprises two components. The first component comprises a means of applying rapid heat pre-treatment to the application areas, which means may apply heat to the application areas either by radiation, conduction or convection, and which means preferably comprise one or more hot air blowers that direct toward the application areas a flow or jet of heated air sufficient to raise the temperature of the application areas to above 150° F. The second component comprises a means of applying the water-based adhesive to the application areas, which means may utilize a roller, an extruder, a sprayer or a foam applicator, and which means preferably comprise one or more sprayers or extruders.

While the general principles of the present invention have been described above, a better understanding of the specific preferred embodiment of the invention can be obtained by referring to the drawing (FIG. 1) in conjunction with the detailed description which follows hereinbelow. While the preferred embodiment specifically applies the present invention to the process of fabricating and sealing corrugated fiberboard containers, it must be emphasized that the scope of application of the present invention extends also to the manufacture of any product the fabrication of which involves adhesive bonding of two surfaces comprising a cellulose or paper-pulp-based material, including without limitation products such as corrugated or non-corrugated paperboard or fiberboard containers, cartons, boxes, trays, corner pads, and/or other structures, as well as paper bags.

DETAILED DESCRIPTION OF THE PREFERRED EMBODIMENT

Figure 1:
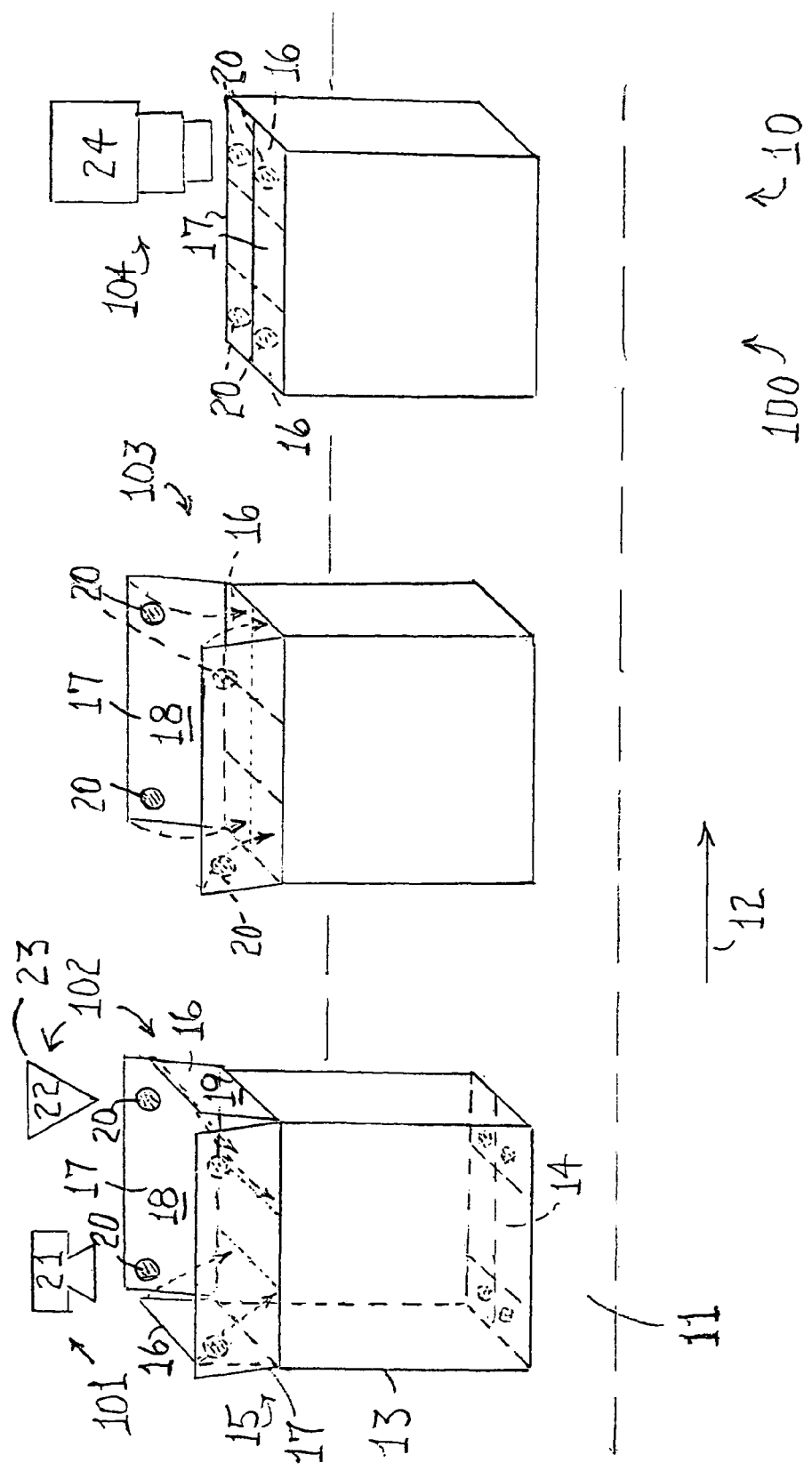
FIG. 1 is a depiction of the closing and sealing of the top flaps of a partially assembled corrugated fiberboard carton utilizing the process and implementing apparatus according to the preferred embodiment of the present invention.

While the following description of the preferred embodiment of the present invention focuses, for illustrative purposes, on the final stage of the formation of a corrugated carton, it should be noted that the same process and associated apparatus described herein can be applied in all phases of the formation of a paperboard or corrugated fiberboard structure, in terms of bonding together any two surfaces that must be joined in order to form the structure.

Referring to FIG. 1, the overall process 100 of the present invention 10 comprises four steps: (1) a rapid heat pre-treatment step 101, (2) an adhesive application and minor flap closure step 102, (3) a major flap closure step 103, and (4) a compression/sealing step 104.

As depicted in FIG. 1, a corrugated carton assembly line 11, having an established line direction and speed 12, conveys a partially assembled carton 13 to a position at which the first two steps 101 and 102 of the process 100 are performed. At this point, the carton 13 has sealed bottom flaps 14 and open top flaps 15. The top flaps 15 comprise two minor flaps 16 and two major flaps 17. The under surfaces of the two major flaps 17 comprise application surfaces 18, while the upper surfaces of the two minor flaps comprise cooperating surfaces 19.

As the carton 14 moves through the first step 101 of the process 100, a plurality of application areas 20 on the application surfaces 18 are briefly heated by one or more heat sources 21, which are preferably hot air blowers that raise the surface temperature of the application areas above 150° F. The duration of exposure of the application areas 20 to the heat sources 21 is less than 3 seconds. The rapid heat pre-treatment 101 of the application areas 20 does not significantly raise the temperature of the application surfaces 18, but instead causes the pores of the substrate comprising the application areas 20 to open and expand.

In the second step 102 of the process 100, one or more adhesive applicators 22 apply a water-based adhesive 23 to the pre-treated application areas 20. The adhesive applicators are preferably of the type that spray or extrude the adhesive 23 onto the application areas 20. While the adhesive 23 is being applied, the minor flaps 16 are closed by one or more flap-closing means (not shown) of the types generally known and practiced in the art.

In the third step 103, the carton 13 moves along the assembly line 11 to a position at which the major flaps 17 are closed by one or more flap-closing means (not shown) of the types generally known and practiced in the art. The third step 103 brings the application surfaces 18 into contact with the cooperating surfaces 19.

In the fourth step 104, pressure is applied to each of the application areas 20 by one or more compression means 24 for approximately 1-3 seconds. After that time, the water-based adhesive 23 has cured, and secure, durable adhesive bonds are formed between the application surfaces 18 and the cooperating surfaces 19. The top flaps 14 of the carton 13 are now sealed shut, with the major flaps 17 bonded to the minor flaps 16.

While this invention has been described with reference to a specific embodiment, the description is not to be construed in a limiting sense. Various modifications of the disclosed embodiment, as well as other embodiments of the invention, will be apparent to persons skilled in the art upon reference to this description. It is therefore contemplated that the description will cover any such modifications or embodiments that fall within the true scope of this invention.

What is claimed is:

1. A process for curing a water-based adhesive comprising:
   (a) providing two surfaces, each comprising a fibrous material, wherein the first surface is an application surface having one or more application area(s), and the second surface is a cooperating surface having one or more cooperating area(s), and wherein the fibrous material comprises multiple fibers and multiple porous interstices;
   (b) a primary rapid heat pre-treatment, using a non-contact heat source to apply heat rapidly to the application area(s), and not to the entire application surface, so as to heat the application area(s) to a pre-treatment temperature in the range of between 150° and 200° F., while the remainder of the application surface remains at or near ambient temperature, and wherein the primary rapid heat pre-treatment causes an expansion of the porous interstices of the fibrous material comprising the application area(s), thereby rendering the application area(s) more penetrable by the water-based adhesive;
   (c) applying the water-based adhesive exclusively to the heated application area(s);
   (d) bringing the application surface into contact with the cooperating surface, such that the application area(s) engage the cooperating area(s);
   (e) applying pressure to the application area(s) during a curing period, such that during the curing period the water-based adhesive cures and one or more adhesive bond(s) are formed between the application area(s) and the cooperating area(s), thereby bonding the application surface to the cooperating surface.

2. The process according to claim 1, comprising the additional step (cd) between step (c) and step (d):
   (cd) a secondary rapid heat pre-treatment, using a non-contact heat source to apply heat rapidly to the cooperating area(s), and not to the entire cooperating surface, so as to heat the cooperating area(s) to a pre-treatment temperature in the range of between 150° and 200° F., while the remainder of the cooperating surface remains at or near ambient temperature, and wherein the secondary rapid heat pre-treatment causes an expansion of the porous interstices of the fibrous material comprising the cooperating area(s), thereby rendering the cooperating area(s) more penetrable by the water-based adhesive.

3. The process according to either claim 1 or 2, wherein the pre-treatment temperature is approximately 180° F.

4. The process according to either claim 1 or 2, wherein the curing period is in the range of 1 to 3 seconds.

5. The process according to claim 3, wherein the curing period is in the range of 1 to 3 seconds.

6. An apparatus for curing a water-based adhesive, comprising:
   (a) two surfaces, each comprising a fibrous material, wherein the first surface is an application surface having one or more application area(s), and the second surface is a cooperating surface having one or more cooperating area(s), and wherein the fibrous material comprises multiple fibers and multiple porous interstices;
   (b) one or more non-contact primary heat source(s), which effect a primary rapid heat pre-treatment by applying heat rapidly to the application area(s), and not to the entire application surface, so as to heat the application area(s) to a pre-treatment temperature in the range of between 150° and 200° F., while the remainder of the application surface remains at or near ambient temperature, and wherein the primary rapid heat pre-treatment causes an expansion of the porous interstices of the fibrous material comprising the application area(s), thereby rendering the application area(s) more penetrable by the water-based adhesive;
   (c) one or more adhesive applicator(s), which apply the water-based adhesive exclusively to the heated application areas;

(d) one or more closure means, which bring the application surface into contact with the cooperating surface, such that the application area(s) engage the cooperating area(s);

(e) one or more compression means, which apply pressure to the application area(s) during the curing period, such that during the curing period the water-based adhesive cures and one or more adhesive bond(s) are formed between the application area(s) and the cooperating area(s), thereby bonding the application surface to the cooperating surface.

7. The apparatus according to claim 6, wherein the non-contact primary heat source(s), or one or more non-contact secondary heat sources, also effect a secondary rapid heat pre-treatment by applying heat rapidly to the cooperating area(s), and not to the entire cooperating surface, so as to heat the cooperating area(s) to a pre-treatment temperature in the range of between 150° and 200° F., while the remainder of the cooperating surface remains at or near ambient temperature, and wherein the secondary rapid heat pre-treatment causes an expansion of the porous interstices of the fibrous material comprising the cooperating area(s), thereby rendering the cooperating area(s) more penetrable by the water-based adhesive.

8. The apparatus according to either claim 6 or 7, wherein the pre-treatment temperature is approximately 180° F.

9. The apparatus according to either claim 6 or 7, wherein the curing period is in the range of 1 to 3 seconds.

10. The apparatus according to claim 8, wherein the curing period is in the range of 1 to 3 seconds.

* * * * *